United States Patent [19]

Taniguchi et al.

[11] Patent Number: 5,764,975
[45] Date of Patent: Jun. 9, 1998

[54] DATA MINING METHOD AND APPARATUS USING RATE OF COMMON RECORDS AS A MEASURE OF SIMILARITY

[75] Inventors: Yoji Taniguchi, Ikeda; Kazuhiro Kawashima, Yokohama; Akinori Ishibashi, Izumi; Hiroshi Yajima, Suita, all of Japan

[73] Assignee: Hitachi, Ltd., Tokyo, Japan

[21] Appl. No.: 623,903

[22] Filed: Mar. 27, 1996

[30] Foreign Application Priority Data

Mar. 31, 1995 [JP] Japan .................. 7-100027

[51] Int. Cl.$^6$ .................................. G06F 17/30
[52] U.S. Cl. ............................ 395/606; 395/601
[58] Field of Search ....................... 395/601, 606

[56] References Cited

U.S. PATENT DOCUMENTS

| | | | |
|---|---|---|---|
| 5,615,341 | 3/1997 | Agrawal et al. | 395/210 |
| 5,664,174 | 9/1997 | Agrawal et al. | 395/606 |
| 5,668,988 | 9/1997 | Chen et al. | 395/612 |

OTHER PUBLICATIONS

Agrawal et al, An Interval Classifer for Database Mining Applications, PROC of the 18th VLDB Conference, Vancouver, BC Canada, 1992, pp. 560–573, Dec. 31, 1992.

Agrawal et al, Database Mining: A Performance Perspective, IEEE Transactions on Knowledge and Data Engineering, vol. 5, No. 6, Dec. 31, 1993, pp. 914–915.

Milne et al, Knowledge Guided Data Mining, IEE Collogium on 'Case Based Reasoning', Mar. 3, 1994, pp. 10/1–3.

Agrawal et al, Mining Sequential Patterns, PROC Eleventh Int'l Conf. oOn Data Engineering, 6–10 Mar. 1995, pp. 3–14.

Houstsma et al, PROC Eleventh Int'l Conf. On Data Engineering, Mar. 10, 1995, pp. 25–33.

IEEE Transaction on Knowledge and Data Engineering, vol. 5, No. 6, Dec. 1993. "Systems for Knowledge Discovery in Databases", C. Matheus, et al.

Primary Examiner—Wayne Amsbury
Attorney, Agent, or Firm—Fay Sharpe Beall Fagan Minnich & McKee

[57] ABSTRACT

The present invention generates a plurality of rules comprising a consequence including records having the characteristics of the target attribute and record items and a precedence including at least one record item in an attribute appearance area decided by at least one record item in a database comprising a plurality of records having at least one record item for the database, calculates the similarity between the rules decided by the rate of records common to two rules among the plurality of rules among respective records satisfying the consequences, and obtains inclusive relations between the rules from the rate of matched record items to mismatched record items in the respective attribute appearance areas of the two rules.

10 Claims, 18 Drawing Sheets

FIG. 3

| CUSTOMER'S NUMBER | AGE | SEX | AREA CODE | DEPOSIT BALANCE | LOAN BALANCE | ... | PURCHASE OF GOOD |
|---|---|---|---|---|---|---|---|
| 00001 | 34 | MALE | 3 | 370 | 1600 | ... | DONE |
| 00002 | 27 | FEMALE | 1 | 940 | 320 | ... | DONE |
| 00003 | 39 | MALE | 7 | 430 | 2900 | ... | NONE |
| : | : | : | : | : | : | : | : |
| 03893 | 44 | FEMALE | 7 | 1750 | 500 | ... | DONE |
| 03894 | 23 | FEMALE | 5 | 140 | 0 | ... | DONE |
| 03895 | 29 | MALE | 6 | 410 | 130 | ... | NONE |
| : | : | : | : | : | : | : | : |

[ RULE 1 ]

IF    AGE    = 35 ~ 40

DEPOSIT BALANCE    = ¥ 20 MILLION ~

THEN   PURCHASE OF GOOD    = DONE

[FITNESS] 37% ( 58 / 156 )

[ RULE 2 ]

IF    AGE    = 40 ~ 45

SEX    = MALE

AREA CODE    = 3

THEN   PURCHASE OF GOOD    = DONE

[FITNESS] 31% ( 71 / 231 )

[ RULE 3 ]

IF    AGE    = 35 ~ 40

LOAN BALANCE    = 0 ~ ¥ 1 MILLION

THEN   PURCHASE OF GOOD    = DONE

[FITNESS] 26% ( 14 / 53 )

. . .
. . .
. . .

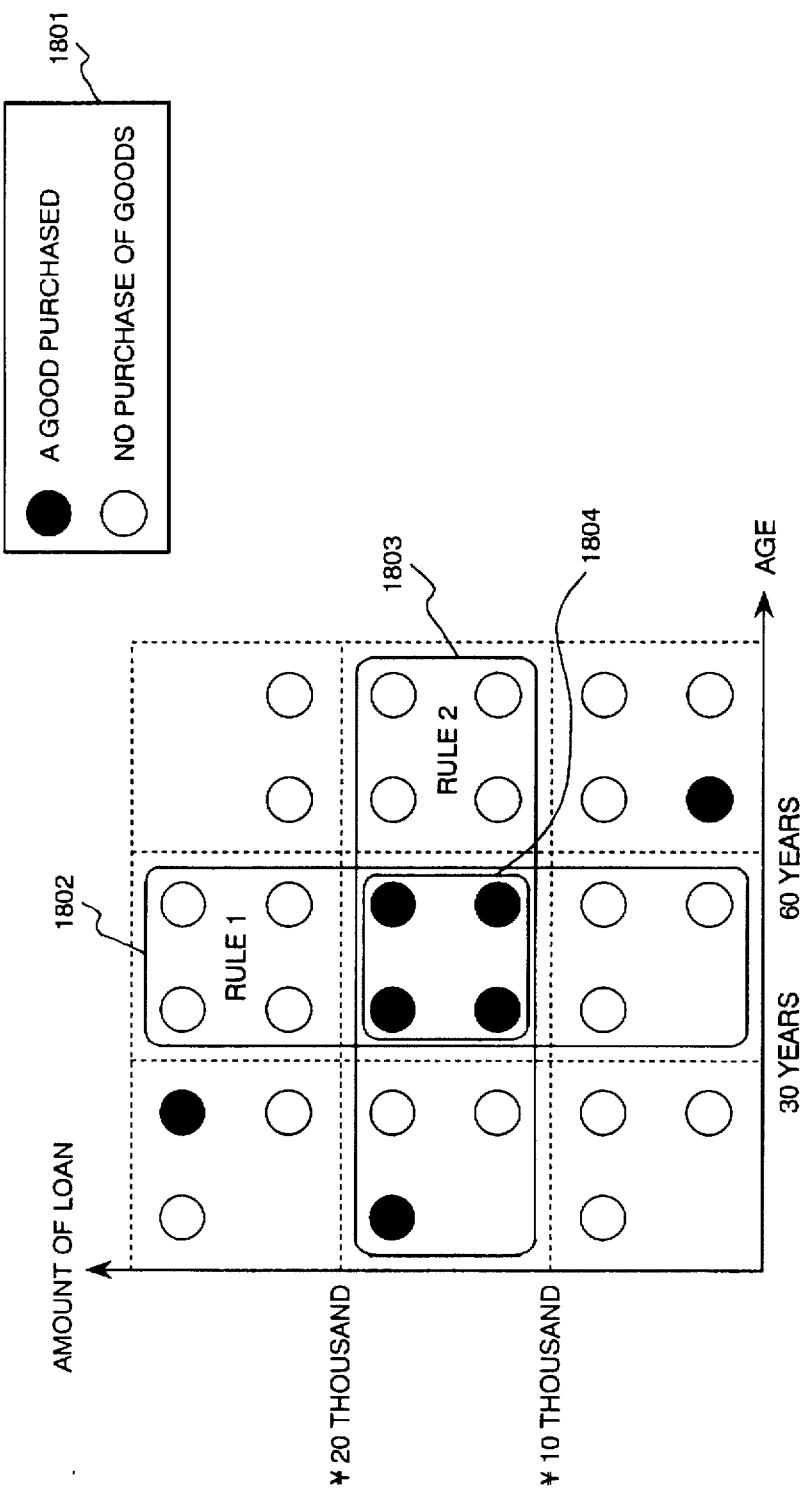

DATA MINING METHOD AND APPARATUS USING RATE OF COMMON RECORDS AS A MEASURE OF SIMILARITY

BACKGROUND OF THE INVENTION

1. [Field of the Invention]

The present invention relates to a data analysis method and system thereof and particularly to a data analysis method and system thereof for deriving the relationship among attributes of records included in a database comprising a large amount of records and representing them in a useful rule format for a user in fields of physical experimentation and business.

2. [Description of the Prior Art]

The data amount stored in a computer increases year by year due to progress of the computer art. Particularly as networks have come into wide use recently, the tendency is becoming more and more conspicuous in online systems and others. It is not uncommon at present that the number of records is more than one million and the data amount is more than giga (109) bytes.

Data itself stored in a computer is often only a group of numerical values or symbols. Therefore, a data mining art for making good use of data by converting the group of data to useful information for a user has been proposed.

For example, in Christopher J. Matheus, et al.: Systems for Knowledge Discovery in Databases, IEEE Trans, on Knowledge and Data Engineering, Vol. 5, No. 6, December 1993, pp 903 to 913, a system for extracting knowledge from a database is discussed.

In this system, a knowledge acquisition method called a rule induction is used. This is a method of outputting an analytical result by converting data to be analyzed into a rule format such as "IF - - - , THEN - - - " which can be understood easily by a user. For example, on pages 23 to 31 of the instruction and operation manual of HITACHI Creative Workstation 2050 ES/TOOL/W-RI, a method of representing the relationship existing among data in a rule format is described.

This method can be used for an object of discovering characteristics such as causality and regularity included in stored data by a user.

The method described in the aforementioned manual will be explained using an example.

Firstly, data is considered as a group of individual cases. In a use method such that a purchase trend of financial goods of customers is checked from a customer database of a back, a combination of information for each customer such as age, deposit balance, job, annual income, and financial goods purchase history is a case and data to be analyzed can be regarded as a group of such cases.

An example of generation of rules by the aforementioned prior art will be explained. As an example, an investigation of partial characteristics of customers who purchase a certain financial goods (assumed as goods A) will be considered.

In this case, it is an object to generate a rule for classifying customers purchasing goods A and customers purchasing no goods A as precisely as possible from the value of each item (age, deposit balance, etc.) of data regarding customers.

In the aforementioned prior art, a combination of precise classification of customers is selected from combinations of item values (for example, the age is more than 40 years and the deposit balance is more than \ 10 million, etc.).

The precision in this case is that among a partial group of customers having several items of special values (the age is more than 40 years and the deposit balance is more than \ 10 million, etc.), as the rate of customers purchasing goods A increases, the characteristics of the customers purchasing goods A can be classified precisely.

A combination of special values of the items can be represented in the rule format of "IF the age is more than 40 years AND the deposit balance is more than \ 10 million, THEN purchase financial goods A". In this case, the part "IF the age is more than 40 years AND the deposit balance is more than \ 10 million" is called a precedence (condition part) of the rule and "IF the age is more than 40 years" and "the deposit balance is more than \ 10 million" are called an item respectively. The part "THEN customers purchase financial goods A" is called a consequence (conclusion part) of the rule.

To discover, understand, and use characteristics such as causality and regularity included in stored data by a user, a few items used in a rule generated by the aforementioned prior art are more useful and about three items are desirable experientially.

However, if a rule having a few items is generated when each data comprises a lot of items as in a customer database in a bank, it becomes highly probable that a lot of rules representing a group of same customers in different items are generated.

It will be explained in detail by referring to FIG. 18. In this case, a case that the number of items of each rule is limited to 1 is considered. In FIG. 18:

Rule 1: IF age=more than 30 years and less than 60 years, THEN purchase goods A, and Rule 2: IF amount of loan=more than \ 10 thousand and less than \ 20 thousand, THEN purchase goods A and customer data to be analyzed is plotted with respect to age and amount of loan.

As shown in 1801, a black circle indicates a customer who purchases goods A and a white circle indicates a customer who purchases no goods A. An area 1802 is a range indicated by the precedence of the rule 1 (age=more than 30 years and less than 60 years) and an area 1803 is a range indicated by the precedence of the rule 2 (amount of loan=more than \ 10 thousand and less than \ 20 thousand). It is found that both the rules 1 and 2 represent characteristics of four customers in an area 1804.

In the aforementioned prior art, it cannot be discriminated whether a plurality of rules generated indicate characteristics of a group of the same data or characteristics of a group of another data. Therefore, a problem arises that characteristics of a number of data groups which may exist in data to be analyzed cannot be grasped precisely.

SUMMARY OF THE INVENTION

An object of the present invention is to provide a data analysis method and system thereof which can classify a plurality of rules generated from stored data into rules having high commonness of data fitted for each of them and rules having no commonness and extract respective rules indicating characteristics of data groups existing respectively in the data.

Another object of the present invention is to provide a data analysis method and system thereof which can classify a plurality of rules generated from stored data into rules having high commonness of data fitted for each of them.

Still another object of the present invention is to provide a data analysis method and system thereof which can define inclusive relations of data fitted for each of a plurality of rules generated from stored data.

To accomplish these objects, the present invention is a data analysis method and system thereof in a data processing system including a database comprising a plurality of records having at least one record item, a processor, and an output device and is characterized in that the present invention generates a consequence comprising at least one of records having the characteristics of the target attribute and record items, generates a precedence of a first rule including at least one record item in a first attribute appearance area decided by at least one record item of at least one record in the aforementioned database, generates a precedence of a second rule including at least one record item in a second attribute appearance area decided by at least one record item different from at least one record item in the first attribute appearance area, calculates the similarity between rules decided by the rate of records common to the first and second rules among the respective records satisfying the consequences of the first rule and the second rule among the records of the database, and analyzes the data of the database by at least one of the first and second rules and the similarity.

More concretely, the present invention is a data analysis method and system thereof for deriving a partial relation between the fields of records of the database in an input device, an output device, a processor having a storage, and a data processing system having a database and the present invention generates rules in the number designated by a user for extracting an appearance area of records having the predetermined characteristics from the entire records or a part of records of the database in the rule format comprising a precedence including at least one record item on the basis of an instruction from an input device of a user and a consequence including one record item together with the rule fitness and displays them on the output device, obtains the rule similarity between the rule designated by the input device of the user and the other rules, displays a set of the designated rule and the other rules having the rule similarity higher than the minimum similarity designated by the input device of the user on the output device, and registers the displayed set of rules in the aforementioned storage or database on the basis of an instruction from the input device of the user.

Furthermore, the present invention selects rules from the rules registered on the basis of the instruction from the input device of the user or generates new rules, obtains the similarity between each pair of rules in the selected rules and newly generated rules, and obtains inclusive relations of the aforementioned pair of rules designated by the input device of the user and furthermore prepares a step of displaying on the output device.

When a set of the designated rule and the other rules having the rule similarity higher than the minimum similarity designated by the input device of the user is displayed on the output device, the present invention displays the other rules having the rule similarity higher than the minimum similarity in the descending order of similarities.

The present invention obtains inclusive relations of the aforementioned pair of rules as a match number comprising the number of records fitted for both of the rules and a mismtach number comprising the number of records fitted for only one rule of them and displays the inclusive relations on the output device as graphics.

The present invention having the aforementioned constitutions has the operation and function indicated below.

The present invention can generate a plurality of rules for extracting an appearance area of records having the predetermined characteristics from the entire records or a part of records of the database by the aforementioned means, display each generated rule and the rule fitness thereof, obtain the rule similarity between the designated rule in the generated rules and the other rules, display a set of the designated rule and the other rules having the rule similarity higher than the minimum similarity, and register the displayed set of rules selectively.

Furthermore, the present invention can select rules from the registered rules or generate new rules, obtain and display the similarity between each pair of rules in the selected rules and newly generated rules, and obtain and display inclusive relations of the designated pair of rules.

The foregoing and other objects, advantages, manner of operation and novel features of the present invention will be understood from the following detailed description when read in connection with the accompanying drawings.

BRIEF DESCRIPTION OF THE DRAWINGS

FIG. 3 is a drawing showing an example of data to be analyzed which is stored in a database to be analyzed.

FIG. 4 is a drawing showing an example of rules generated by a rule generation module.

FIG. 18 is a drawing for illustrating two rules representing a group of same customers by different items.

[DETAILED DESCRIPTION OF THE PREFERRED EMBODIMENTS]

The embodiment of the present invention will be explained hereunder with reference to the accompanying drawings.

In this embodiment, an example of analysis of customers who purchase financial goods is used.

Figure 1:
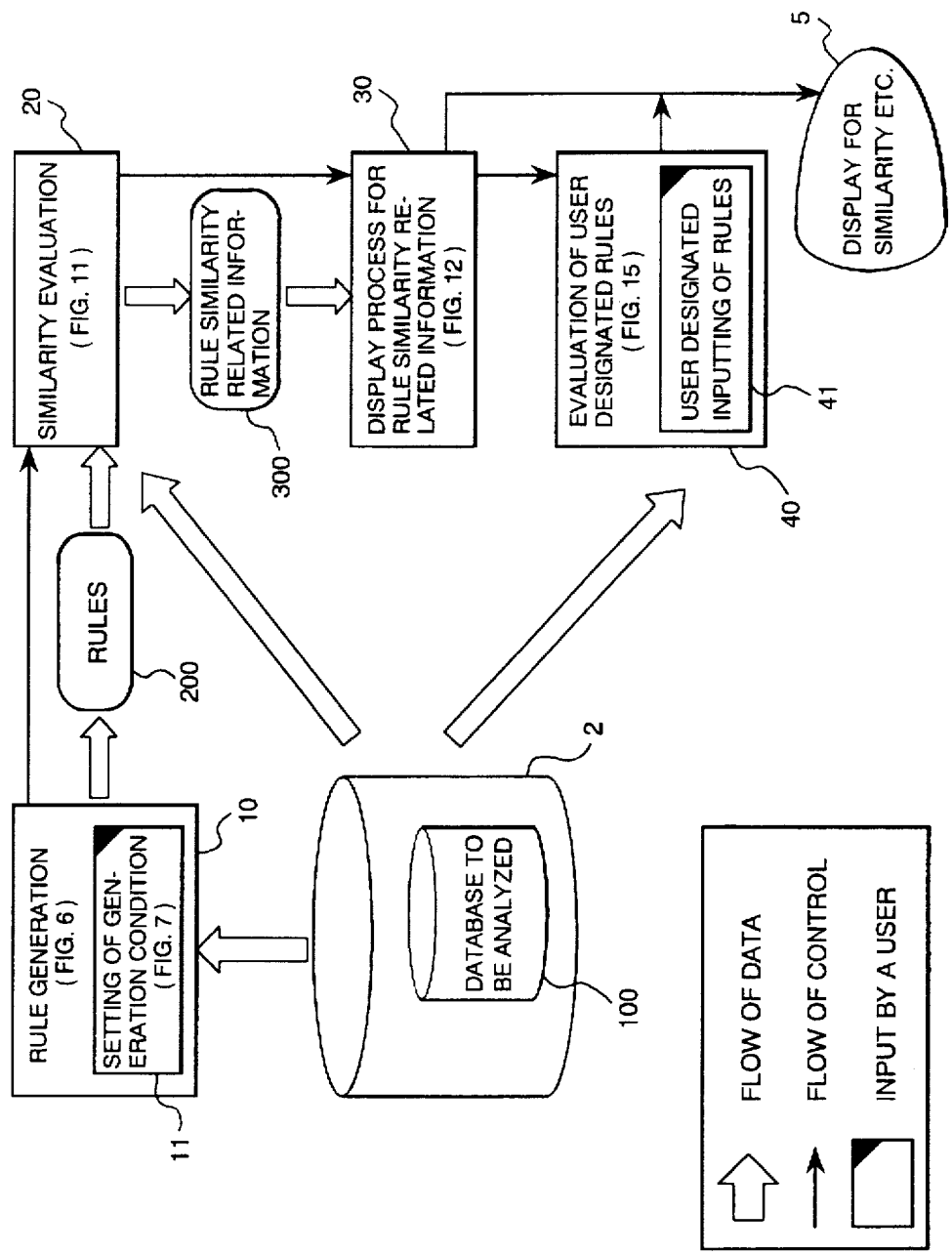
FIG. 1 is a drawing showing the entire constitution of a data analysis process of this embodiment.

FIG. 1 shows the entire constitution of an analysis process of this embodiment.

A rule generation process 10 reads data to be analyzed from a database to be analyzed 100, performs a setting process for rule generation condition 11, and generates a plurality of rules 200.

A similarity evaluation process 20 inputs the rules 200 and outputs generated rule similarity related information 300 on the basis of the number of matches and the number of mismatches of the data to be analyzed.

A display process for rule similarity related information 30 inputs the rule similarity related information 300 and displays and registers a plurality of similarity relations between the rules on an output device 5 as graphics.

A user decides by looking at the display of rule similarity related information and inputs a plurality of rules by selecting from the generated rules or defining newly.

An evaluation process for user designated rules 40 obtains the fitness of the inputted user designated rules and the similarity between rules from the aforementioned data to be analyzed and outputs them to the output device 5.

Figure 2:
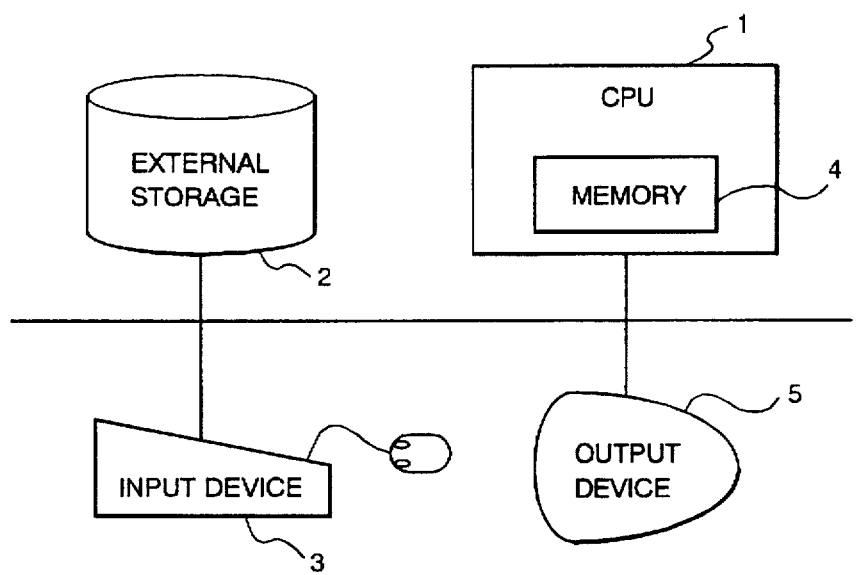
FIG. 2 is a drawing showing the hardware constitution of a system for executing the analysis process of this embodiment.

FIG. 2 shows a hardware constitution of a system for executing the aforementioned analysis process. The system comprises a CPU 1 and a memory 4 for executing the process, an external storage 2 for storing the database to be analyzed 100, an input device 3 including a keyboard and a mouse for inputting user defined rules, and an output device 5 for outputting the aforementioned similarity relations and fitness.

FIG. 3 shows an example of data to be analyzed which is stored in the database to be analyzed 100.

In this case, analysis of the customer trend will be considered with respect to purchase of a certain financial goods. In the data shown in FIG. 3, purchase results of a certain financial goods are stored together with information including customer's number, age, sex, area code, deposit balance, and loan balance.

An object of a user who attempts to analyze the data is to analyze attributes of customers affecting purchase of a financial goods so as to investigate a strategy for sales promotion of the financial goods (what is a most suitable customer type to approach, etc.) such as direct mail or visiting sale.

FIG. 4 shows an example of the rules 200 generated by the rule generation module 10.

A rule 1 indicates that 37% (fitness) of customers whose age is more than 35 years and less than 40 years and whose deposit balance is more than \ 20 million purchase financial goods.

A rule 2 indicates that 31% (fitness) of customers whose age is more than 40 years and less than 45 years, whose sex is male, and whose area code is 3 purchase financial goods.

A rule 3 indicates that 26% (fitness) of customers whose age is more than 35 years and less than 40 years and whose load balance is less than \ 1 million purchase financial goods.

The rule 1, rule 2, rule 3, - - - are lined in the descending order of fitnesses.

Figure 5:
FIG. 5 is a drawing showing an example of rule similarity related information obtained by similarity evaluation.

FIG. 5 shows an example of the rule similarity related information 300 obtained by the similarity evaluation process 20.

This is an example of information used when one rule is designated from the rule 200, and it is set as a special rule, and the other rules are lined and displayed in the descending order of similarities with the designated rule. The similarity will be described later.

This is an example that the minimum similarity of the displayed rules is 0.8 and indicates that M rules having a similarity with the designated rule of more than 0.8 are detected and the rule 5 has a highest similarity with the designated rule and the similarity thereof is 0.98. Details of each process will be explained sequentially hereunder with reference to FIG. 1.

Figure 6:
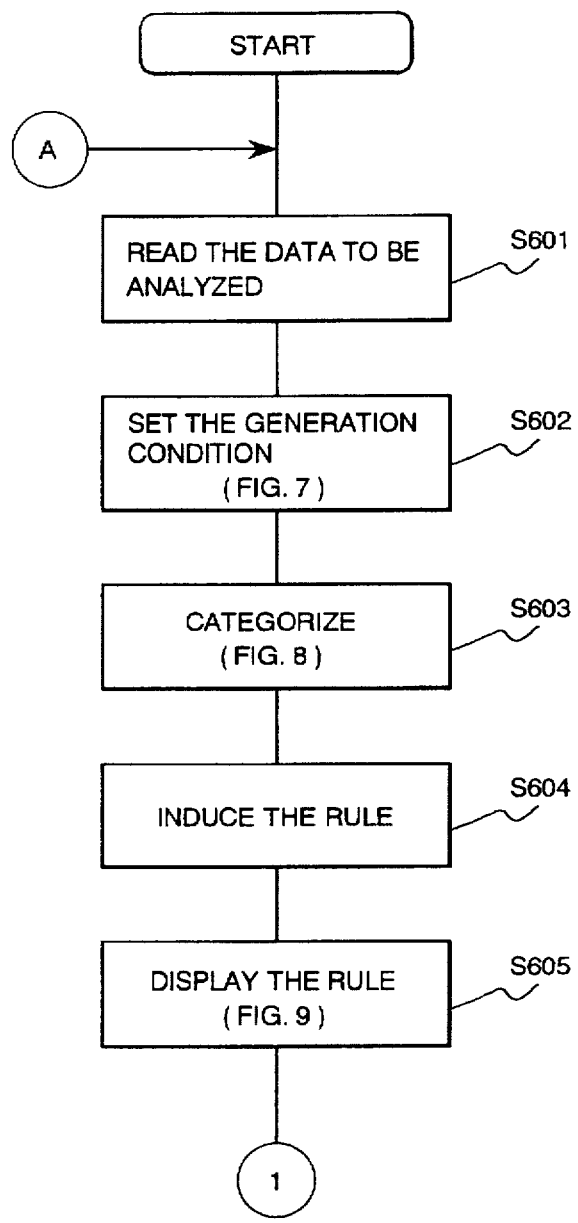
FIG. 6 is a drawing showing a flow chart of the rule generation module.

FIG. 6 shows a processing flow chart of the rule generation module 10.

At Step 601, the rule generation module 10 reads data to be analyzed from the database to be analyzed 100.

Figure 7:
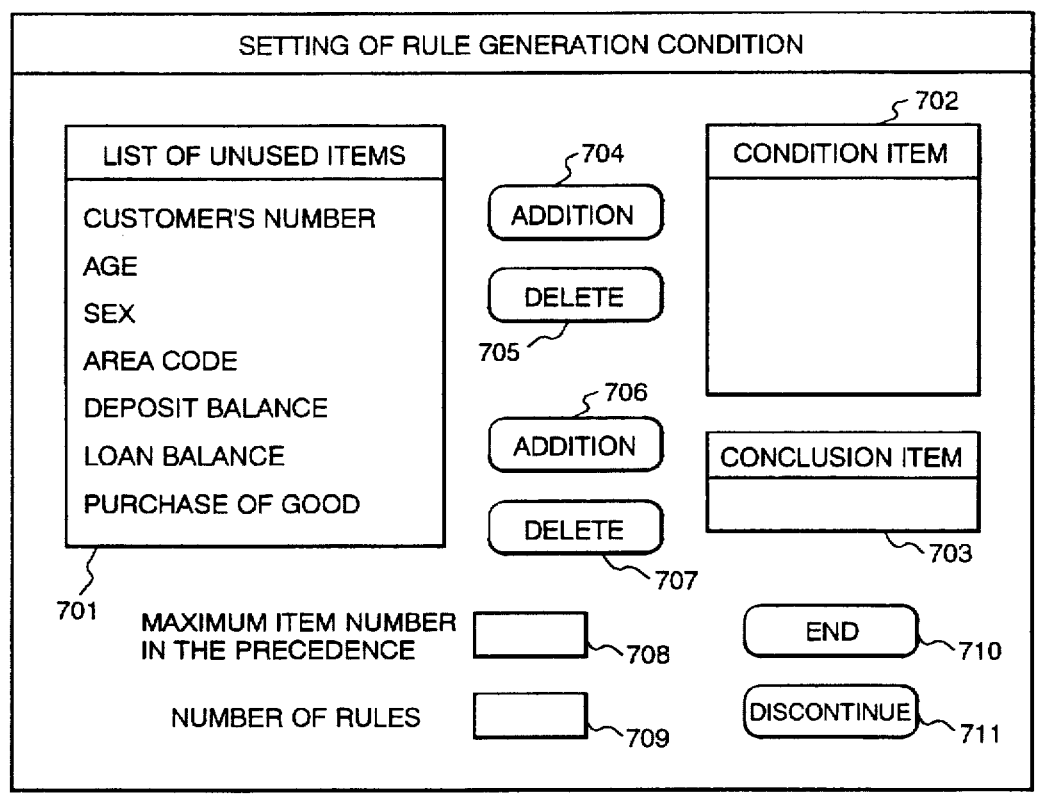
FIG. 7 is a drawing showing an example of a setting screen for rule generation conditions.

At Step 602, the rule generation module 10 sets rule generation conditions including the condition item, conclusion item, maximum precedence number, and number of rules. FIG. 7 shows a setting screen for rule generation conditions.

Firstly, no item is selected immediately after the data to analyzed is read, and the name of each item of the data to be analyzed shown in FIG. 3 is displayed in a list box of unused item names 701, and the contents of a list box of condition item names 702 and a list box of conclusion item names 703 are empty.

When a plurality of items in the list box 701 are selected by the input device 3 such as the mouse and a button 704 is clicked, the items under selection are selected as conditions items, and the item names are deleted from the list box 701, and the item names are added and displayed in the list box 702.

When one item is selected from the list box 701 and a button 706 is pressed in the same way, a conclusion item is selected.

When items are deleted from the list box 702 or the list box 703, the items to be deleted are selected and a button 705 or 706 is clicked in the same way.

Furthermore, the maximum item number in the precedence of the rule is inputted in a text area 708 and the number of rules is inputted in a text area 709 using the input device 3 such as the keyboard.

When a button 710 is clicked after the aforementioned selection and input end, the setting process for rule generation conditions ends. When a button 711 is clicked, the setting information of rule generation conditions at that point of time is all canceled.

At Step 603, the rule generation module 10 categorizes numerical items (age, deposit balance, etc.). Categorization indicates a process for converting a numerical value to a symbol.

Figure 8:
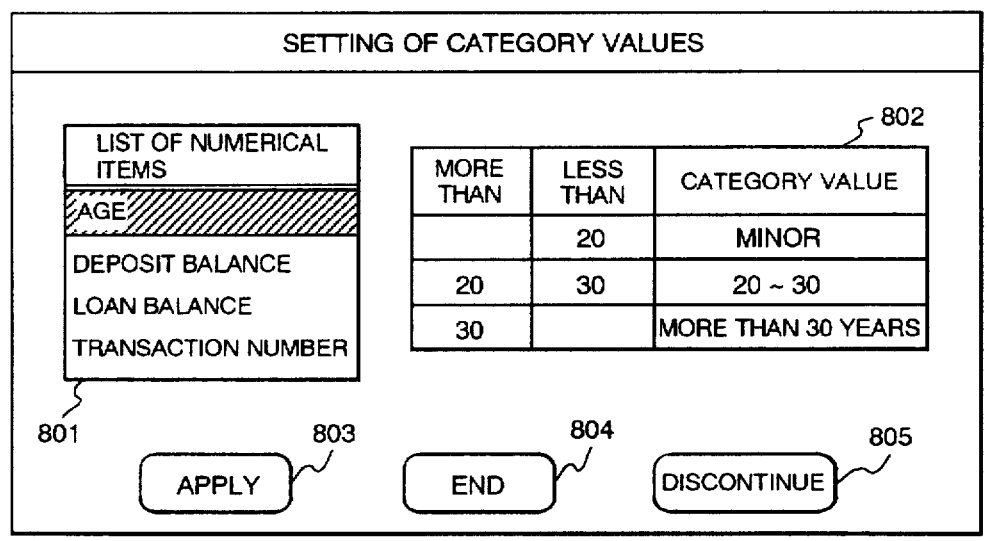
FIG. 8 is a drawing showing an example of a setting screen for category values.

FIG. 8 shows a setting screen for category values.

Firstly, when setting of category values starts, numerical items among items set in the condition item or conclusion item in the setting of rule generation conditions are displayed in a list box 801. From the numerical items, numerical items to which category values are set are clicked and selected by the input device 3 such as the mouse. Next, the category range and category values are inputted in a list box 802 using the input device 3 such as the keyboard. In FIG. 8, "age" is selected as a numerical item to which category values are set and with respect to "age", a category value of "minor" is set as data of a category (range) of "more than 0 years and less than 20 years", and a category value of "20 to 30" is set as data of a category (range) of "more than 20 years and less than 30 years", and a category value of "more than 30 years" is set as data of a category (range) of "more than 30 years".

When a button 803 is clicked after these inputs end, the age is categorized.

When the same operation is performed for other numerical items and a button 804 is clicked, the setting process for category values ends. When a button 805 is clicked, the setting information of categorization at that point of time is all canceled.

At Step 604, rules are induced from data to be analyzed in which the numerical items are categorized and all the items are symbolized. Induction of rules is known in the document described in the section of the prior art and others. Among sets of items (for example, the age is more than 40 years and the deposit balance is more than \ 10 million, etc.), a set classifying the given data most precisely is induced. The precision in this case is that as the rate (fitness) of cases corresponding to customers who purchase financial goods A among a partial group of cases having a special value increases, the characteristics of the customers purchasing the goods are classified precisely. This set of value is represented in the rule format of "IF the age is more than 40 years AND the deposit balance is more than \ 10 million, THEN purchase financial goods A".

At Step 605, the induced rules are displayed on the output device 5 in the descending order of fitnesses.

Figure 9:
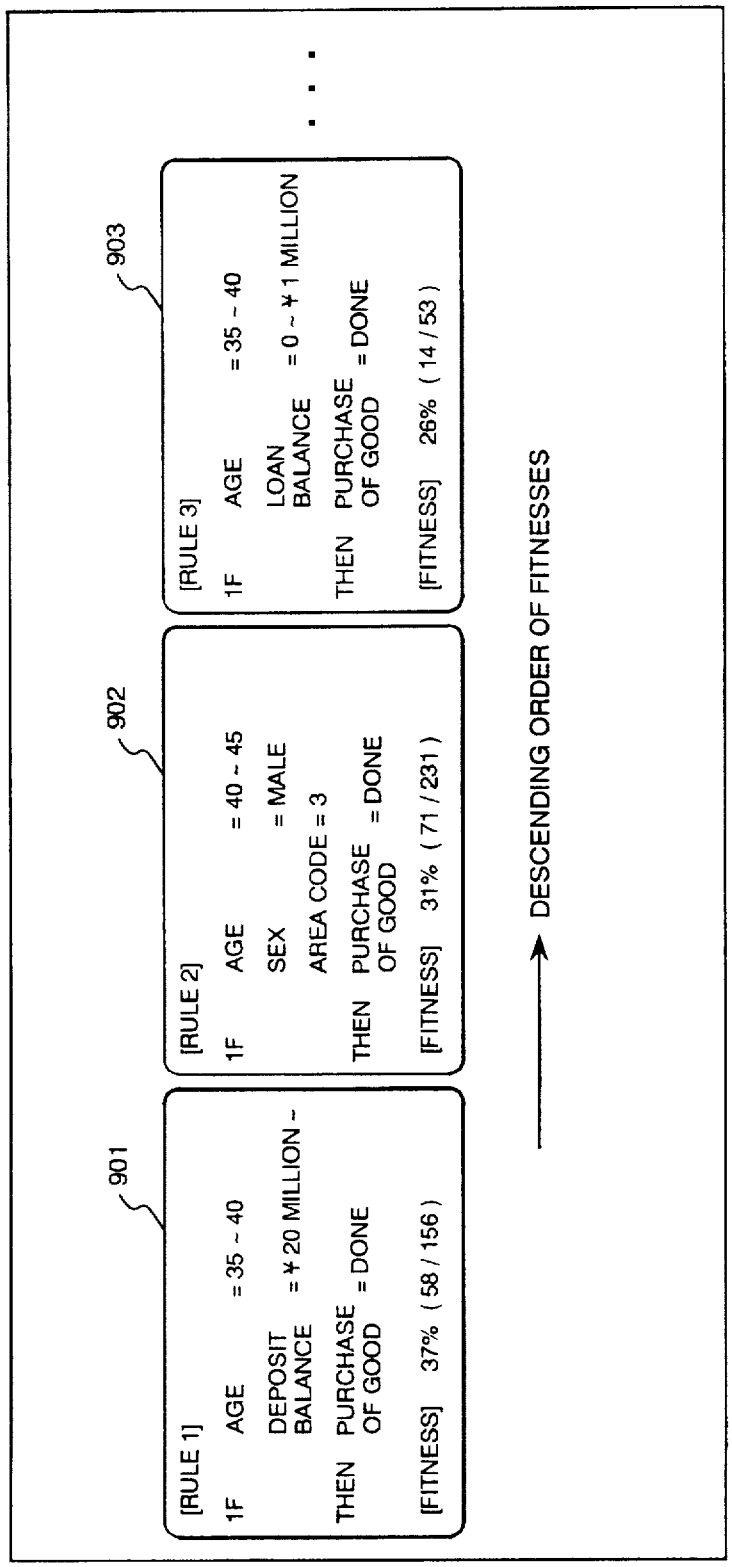
FIG. 9 is a drawing showing a screen display example of induced rules.

FIG. 9 shows a screen display example.

For example, numeral 901 indicates a rule indicating "37% (fitness) of customers whose age is more than 35 years and less than 40 years and whose deposit balance is more than \ 20 million purchase financial goods". Numerals 901, 902, 903, - - - are lined in the descending order of rule fitnesses from left.

Figure 10:
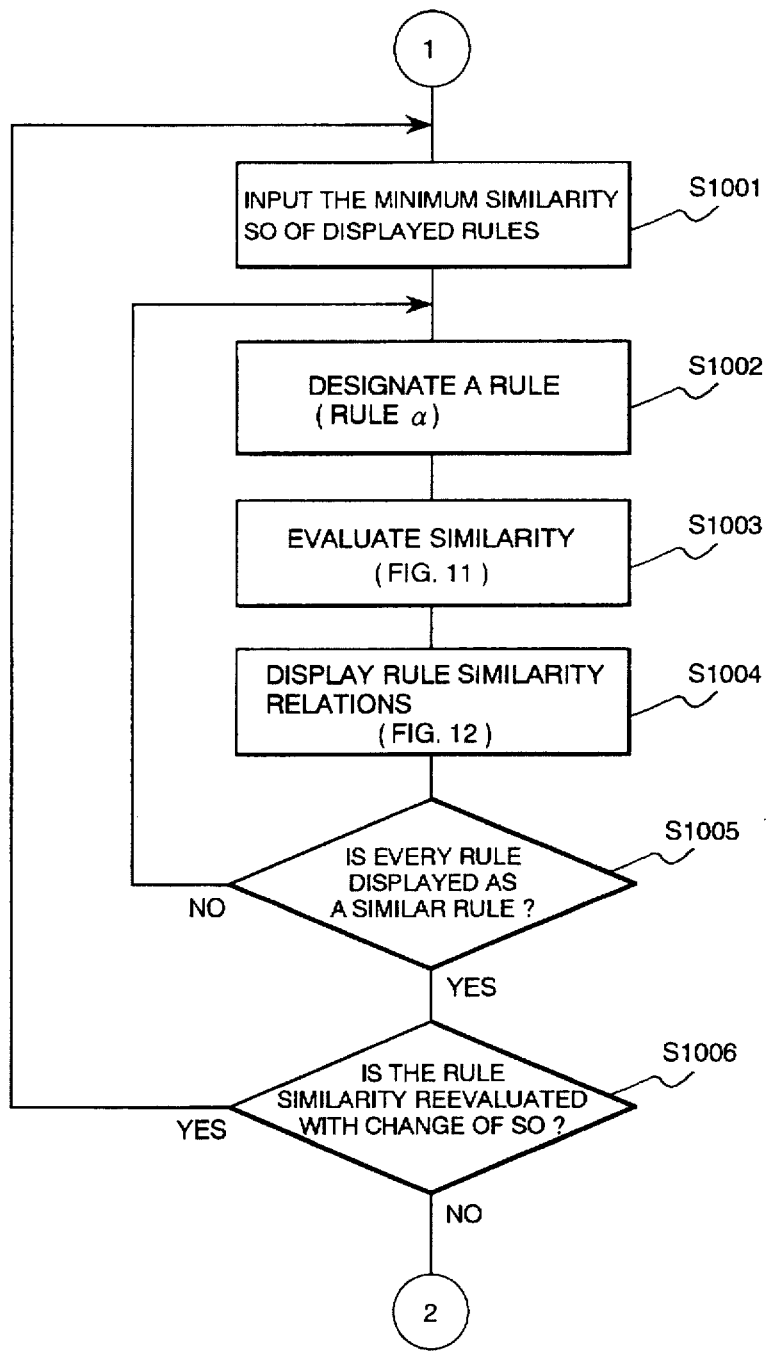
FIG. 10 is a drawing showing a flow chart from similarity evaluation to display module for similarity between rules.

FIG. 10 shows a processing flow chart from the similarity evaluation process 20 to the display module for similarity between rules 30.

At Step 1001, the program displays the designated rule as well as inputs the minimum similarity (So) of displayed similar rules.

At Step 1002, the program designates a rule (rule α) as a designated rule from the rules displayed in the descending order of fitnesses by the input device 3 such as the mouse. At Step 1003, the program executes the similarity evaluation process 20 between the rule α and the other rules.

Figure 11:
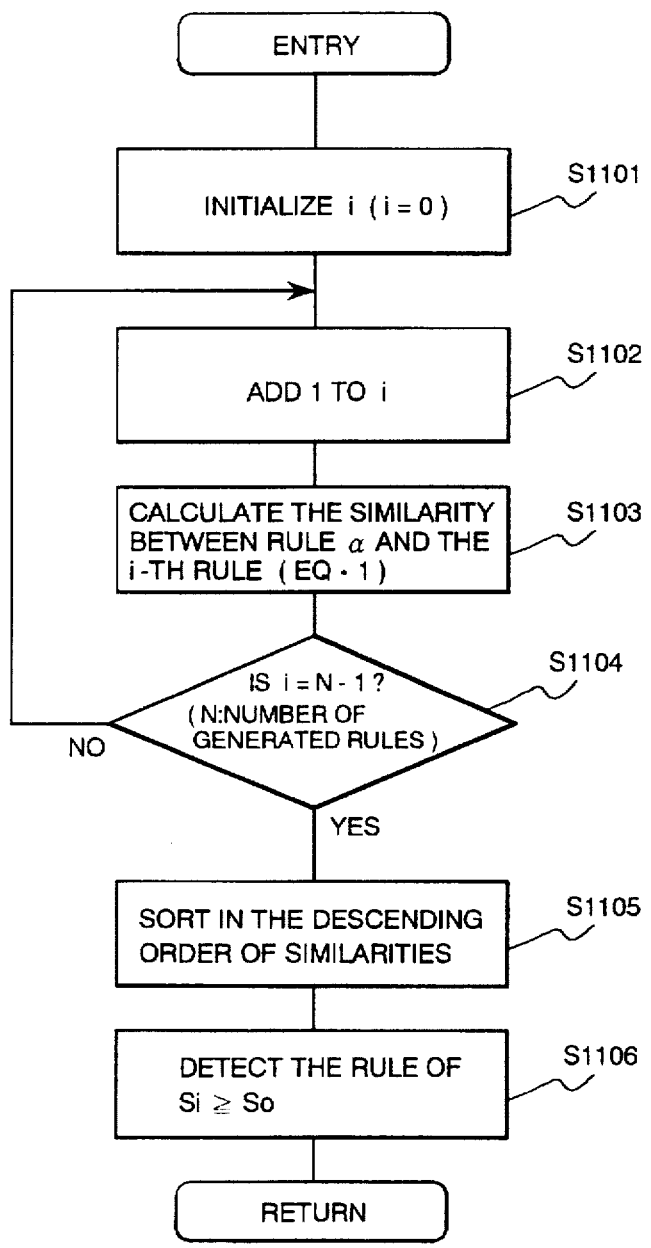
FIG. 11 is a drawing showing a detailed flow chart of similarity evaluation.

FIG. 11 shows a detailed flow chart of similarity evaluation.

At Step 1101, the program initializes "i" which is a counter and at Step 1102, the program adds 1 to "i". At Step 1103, the program calculates the rule similarity Si between the rule α and the i-th rule other than α. Formula (1) is used for calculation of the similarity.

$$Si=A/B \quad (1)$$

where:

A=Number of product sets of data fitted for the rule α and data fitted for the rule i B=Number of sum sets of data fitted for the rule α and data fitted for the rule i At Step 1104, the program decides whether the similarity evaluation between the rule α and all the other rules ends or not. When it ends, the program goes to Step 1105 and when it does not end, the program returns to Step 1102.

At Step 1105, the program sorts the rules other than the rule α in the descending order of similarities and at Step 1106, the program detects rules having a similarity Si more than So and generates the rule similarity related information 300.

At Step 1004, the program executes the display process for rule similarity related information 30 using the rule similarity related information 300.

Figure 12:
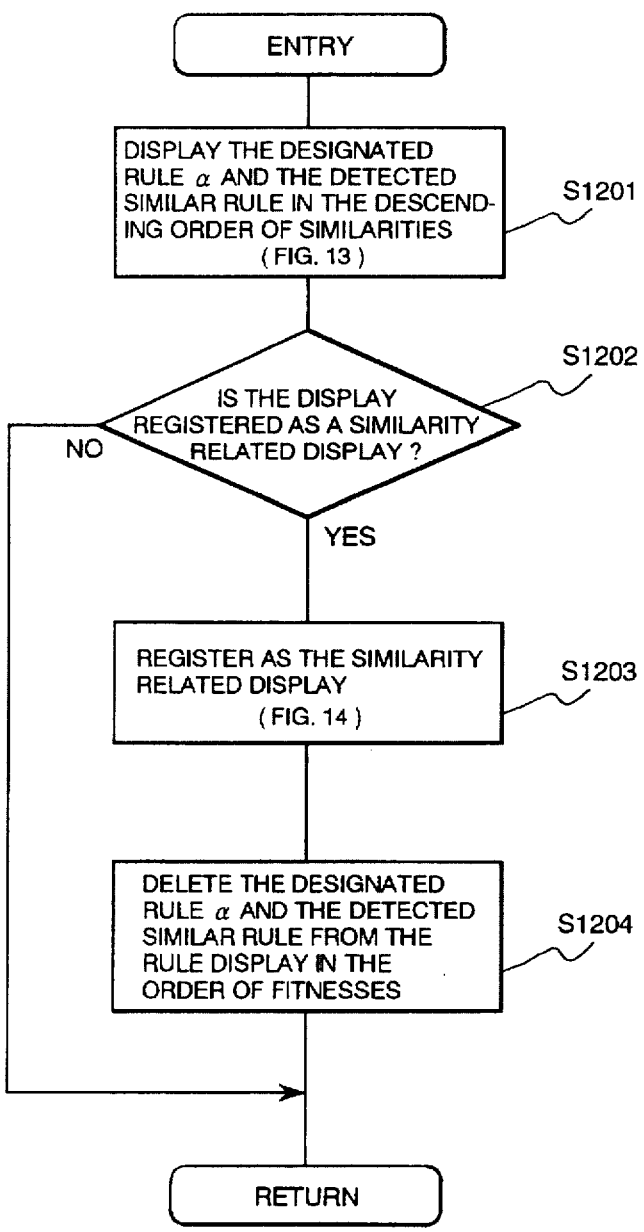
FIG. 12 is a drawing showing a detailed flow chart of display module for similarity between rules.
Figure 13:
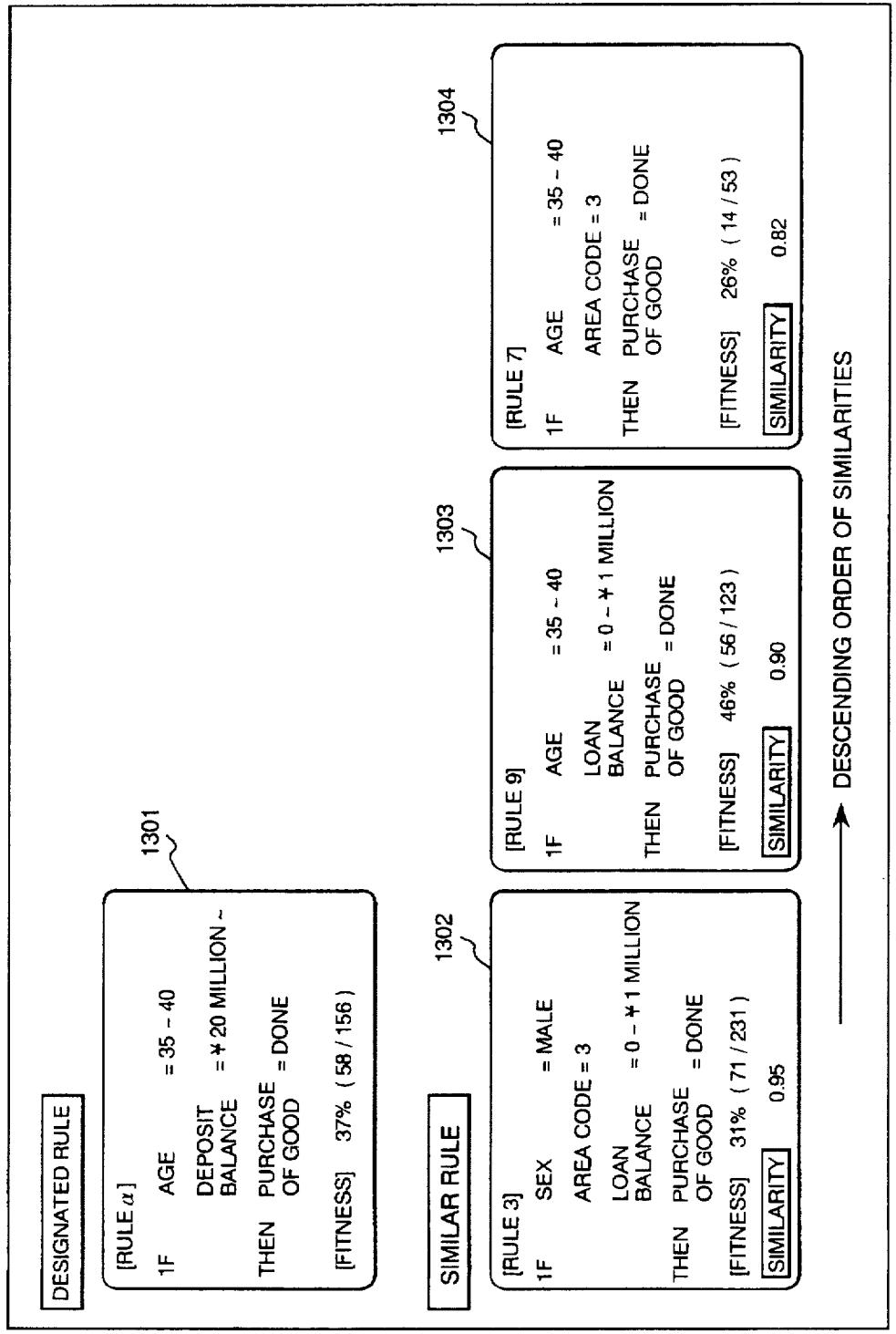
FIG. 13 is a drawing showing a screen display example of a designated rule α and detected similar rules.

FIG. 12 shows a detailed processing flow chart of the display process for rule similarity related information 30. At Step 1201, the program displays the designated rule α and the detected similar rules on the output device 5 in the descending order of similarities. FIG. 13 shows a display example.

Under an area 1301 indicating the designated rule α, three areas indicating similar rules are displayed in the descending order of similarities. This is a display example when the similarity So is set to 0.8 and indicates that there are three rules, the similarity So of which with the designated rule α is more than 0.8.

At Step 1202, a user selects whether or not to display the display content at Step 1201 as a similarity related display as a similar rules group. When the display content is to be registered, the program goes to Steps 1203 and 1204 and when it is not to be registered, the program ends the process.

At Step 1203, the program displays the display content at Step 1201 in a new window of the output device 5 as a similarity related display. Hereafter, display contents to be registered are additionally displayed in this window.

Figure 14:
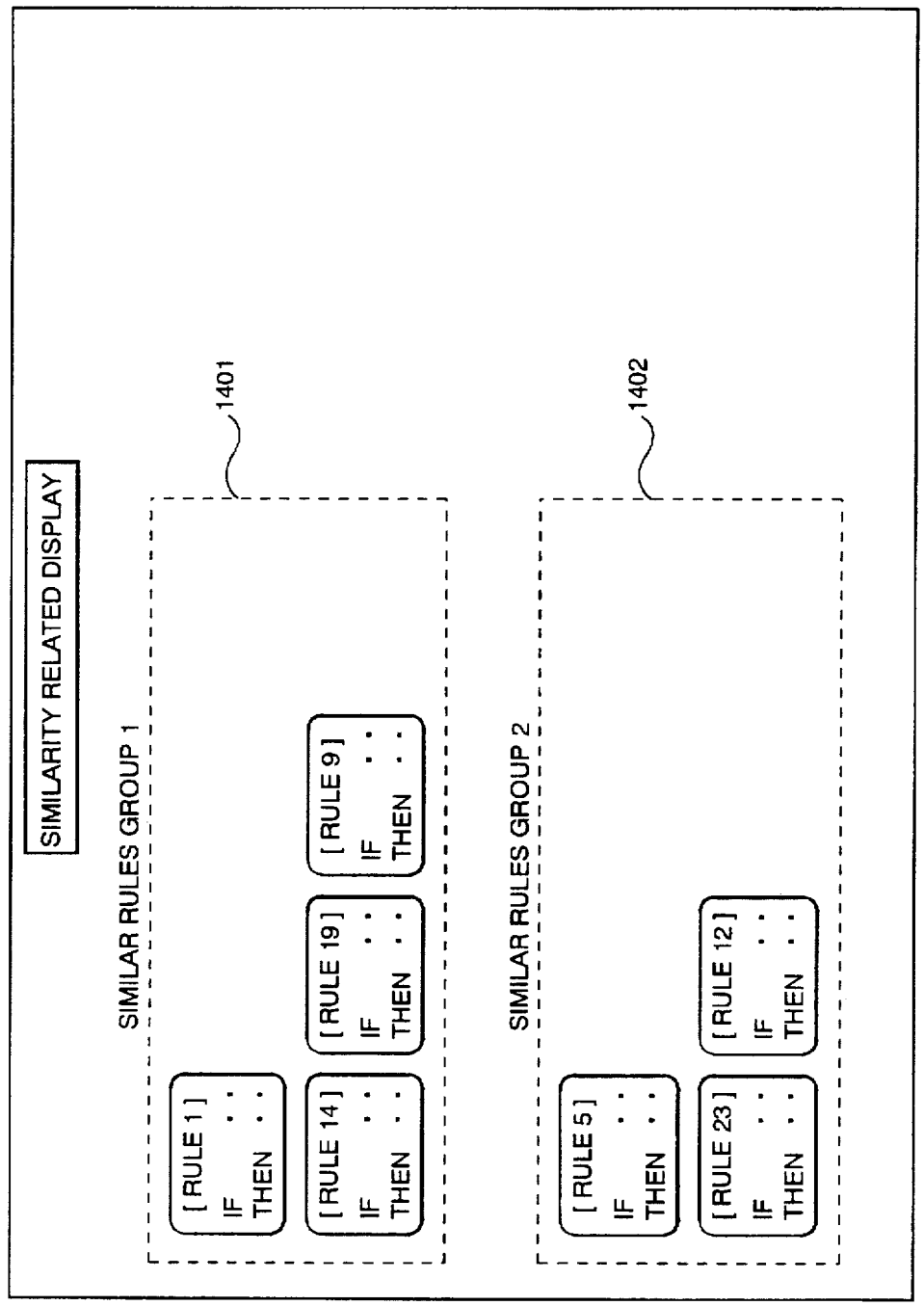
FIG. 14 is a drawing showing an example of a similarity related display.

FIG. 14 shows an example of a similarity related display. In an area 1402, a rule 23 and a rule 12 which are similar to the rule 5 are displayed as a second similar rules group. At Step 1204, the program deletes the designated rule α and the detected similar rules from the rule display in the descending order of fitnesses (FIG. 9) displayed at Step 1002 and ends the process.

At Step 1005, the program decides whether the similarity related display of all the generated rules 200 as a similar rule group ends or not. When the similarity related display ends, the program goes to Step 1006 and when it does not end, the program returns to Step 1002. At Step 1006, the program selects whether or not to reevaluate the similarity with the minimum similarity So of displayed rules changed. When the similarity is to be reevaluated, the program returns to Step 1001 and when it is not to be reevaluated, the program goes to the evaluation process of user designated rules 40.

As mentioned above, it is possible to evaluate the similarity between a plurality of rules generated and classify them into similar rule groups by the similarity evaluation process 20 and the display process for rule similarity related information 30, so that it is possible to select rules from respective similar rule groups and extract a rule indicating a group of data which is useful for a user and independent.

Figure 15:
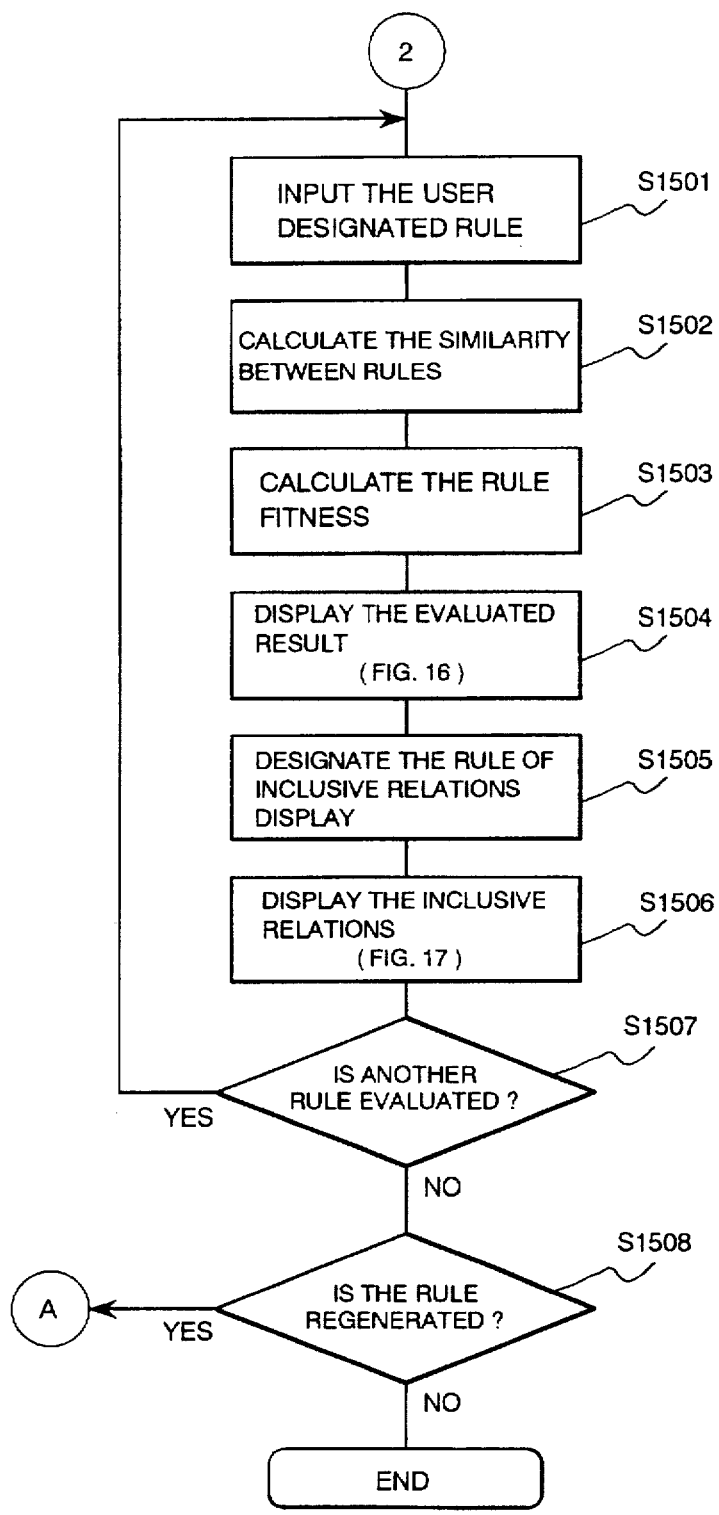
FIG. 15 is a drawing showing a flow chart of evaluation of user designated rules.

FIG. 15 shows a processing flow chart of the evaluation process of user designated rules 40.

At Step 1501, a user looks at a similarity related display between rules and inputs a plurality of rules by selecting them from a generated rule group or by newly defining them. Rules are selected from the generated rule group by clicking the mouse. Rules are newly defined by the user in the if then rule format using the keyboard.

The two cases indicated below are considered to require a new rule definition by a user.

(1) When rules can be combined

Rule 1: "IF the age is more than 20 years and less than 30 years, THEN purchase goods."

Rule 2: "IF the age is more than 30 years and less than 40 years, THEN purchase goods."

When both fitnesses of the two rules are high, the following combination can be considered.

After combination: "IF the age is more than 20 years and less than 40 years, THEN purchase goods."

(2) When by combining condition items used in similar rules, the rules can be changed to rules of high utility value The number of condition items displayed in the precedence of a rule is limited by the maximum item number in the precedence. However, in some cases, if the number of condition items is increased, there is a possibility that a rule of high utility value can be obtained.

At Step 1502, the program calculates the similarity between a plurality of inputted rules using Formula (1).

At Step 1503, the program calculates the fitness of a plurality of inputted rules using the data to be analyzed. The fitness is the same as the aforementioned fitness and it is a rate (%) of data satisfying the consequence among data satisfying the precedence of a rule.

At Step 1504, the program displays the evaluated result of the user designated rule.

Figure 16:
FIG. 16 is a drawing showing a screen display example of evaluation results of user designated rules.

FIG. 16 shows a display example.

For example, the example shows that the fitness of a rule 1 is 70%, and the similarity with another rule is 0.1 for a rule 3, 0.0 for a rule 5, and 0.13 for a rule 9.

At Step 1505, the program designates two rules which are objects of inclusive relations display. The designation is executed by clicking the text area by the mouse, in which the similarity of the evaluated result of the user designated rule is displayed. For example, when a text area 161 shown in FIG. 16 is clicked, the rules 1 and 3 are designated.

At Step 1506, the program displays the inclusive relations of the two designated rules.

Figure 17A:
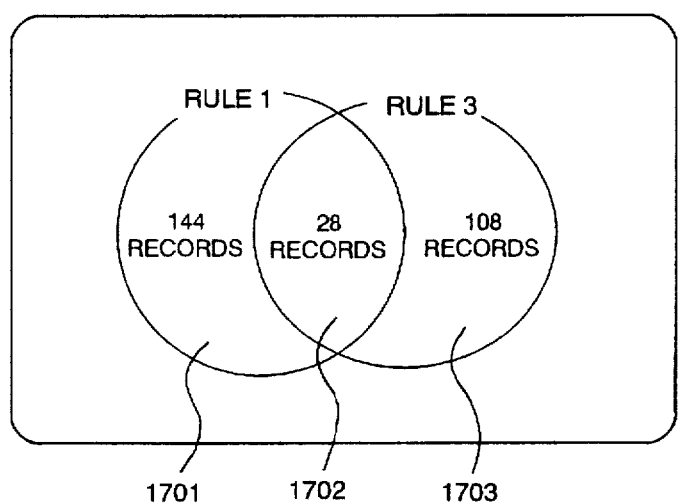
FIGS. 17a and FIG. 17b are drawings showing screen display examples of inclusive relations of two designated results.
Figure 17B:
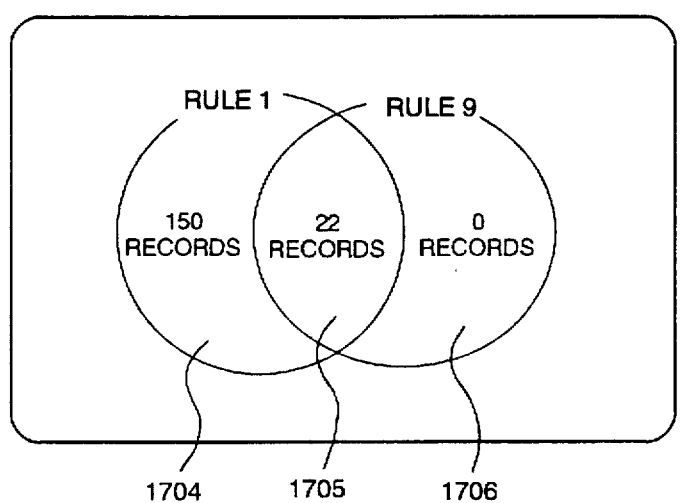

FIG. 17 shows a display example.

The number of data items (records) fitted for each rule is displayed in the corresponding graphic area on a Venn diagram. Namely, the number of data items (records) fitted for only one rule is displayed in two areas such as an area 1701 and an area 1703 and the number of data items (records) commonly fitted for both rules is displayed in an area 1702.

In Fig. (a), data is uniformly distributed in all the three areas and the two rules have no data in common. In Fig. (b), the number of data items (records) in an area 1706 is 0, and there is no data fitted only for the rule 9, and the data fitted for the rule 1 includes the data fitted for the rule 9.

When the program evaluates another rule at Step 1507, it returns to Step 1501 and when the program does not evaluate another rule, it goes to Step 1506.

When the program regenerates the rule at Step 1508, it returns to Step 601 and when the program does not regenerate it, it ends the process.

The following effects can be realized by the aforementioned evaluation process for user designated rules 40.

Since a user can look through a plurality of similarity relations between rules which are selected or defined by him from the evaluation result table of user designated rules, he can confirm the independency of a group of data indicated by a rule necessary for use of the rule.

When (1) a rule can be combined or (2) a rule can be changed to a rule of high utility value by combining condition items used in a similar rule, he can evaluate the independency and fitness by a new rule definition by him, so that he can extract a rule of utility value higher than that of the generated rule itself.

[Effects of the Invention]

By the method described in this embodiment, the present invention obtains good results indicated below.

Since the similarity between a plurality of rules generated can be evaluated by the similarity evaluation process and the similarity display process and rules can be classified into similar rule groups, a user can select a rule from each similar rule group and extract an independent rule useful for him.

In the evaluation process for user designated rules, since a user can look through a plurality of similarity relations between rules which are selected or defined by him from the evaluation result table of user designated rules, he can confirm the independency and fitness of a rule which are necessary for use of the rule.

When (1) a rule can be combined or (2) a rule can be changed to a rule of high utility value by combining condition items used in a similar rule, he can evaluate the independency and fitness by a new rule definition by him, so that he can extract a rule of utility value higher than that of the generated rule itself.

The invention claimed is:

1. A data analysis method in a data processing system including a database comprising a plurality of records having at least one record item, a processor, and an output device comprising:

a step of generating a consequence comprising at least one of records having the characteristics of a target attribute and record items by said processor;

a step of generating a precedence of a first rule including at least one record item in a first attribute appearance area decided by at least one record item of at least one record in said database by said processor;

a step of generating a precedence of a second rule including at least one record item in a second attribute appearance area decided by at least one record item which is different from at least one record item in said first attribute appearance area by said processor;

a step of calculating the similarity between rules decided by the rate of records common to said first and second rules among respective records satisfying said consequences of said first rule and second rule among said records of said database by said processor; and a step of analyzing said data of said database by at least one of said first and second rules and said similarity.

2. A data analysis method according to claim 1, further comprising:

a step of calculating the rate of records satisfying said consequences correctly among said records in said first and second attribute appearance areas as a first and a second similarity respectively.

3. A data analysis method according to claim 1, further comprising:

a step of designating at least one record item in said first and second attribute appearance areas from the outside.

4. A data analysis method according to claim 1, further comprising:

a step of designating a special rule among said generated rules when a plurality of rules satisfying said consequences exist; and a step of calculating the similarity between said special rule and other rules.

5. A data analysis method according to claim 4, further comprising:

a step of designating the minimum similarity; and a step of outputting rules having similarities higher than said minimum similarity among said generated rules from said output device together with each similarity.

6. A data analysis method according to claim 4, further comprising:

a step of designating the minimum similarity; and a step of outputtting rules having similarities higher than said minimum similarity among said generated rules from said output device together with each similarity in the descending order of said similarities.

7. A data analysis method according to claim 1, further comprising:

a step of designating a special rule among said generated rules when a plurality of rules satisfying said consequences exist;

a step of calculating the similarity between said special rule and other rules; and a step of obtaining inclusive relations between said attribute appearance areas from the rate of matched records to mismatched records in each of said attribute appearance areas of said special rule and other rules.

8. A data analysis method according to claim 1, further comprising:

a step of setting a rule which is a standard for satisfying said consequences;

a step of calculating the similarity between said standard rule and other rules; and a step of obtaining inclusive relations between said attribute appearance areas from the rate of matched record items to mismatched record items in each of said attribute appearance areas of said standard rule and other rules.

9. A data analysis method according to claim 1, further comprising:

a step of outputting said inclusive relations of said first and second rules to said output device as said inclusive relations from the number of matches comprising the number of records fitted for both of said rules and the number of mismatches comprising the number of records fitted for only one of said rules.

10. A data analysis system in a data processing system including a database comprising a plurality of records having at least one record item, a processor, and an output device comprising:

means for generating a consequence comprising records having the characteristics of a target attribute;

means for generating a precedence of a first rule including at least one record item in a first attribute appearance area decided by at least one record item of at least one record in said database;

means for generating a precedence of a second rule including at least one record item in a second attribute appearance area decided by at least one record item which is different from at least one record item in said first attribute appearance area;

means for calculating the similarity between rules decided by the rate of records common to said first and second rules among respective records satisfying said consequences of said first rule and second rule among said records of said database; and means for analyzing said data of said database by at least one of said first and second rules and said similarity.

* * * * *